(12) United States Patent
Han

(10) Patent No.: US 7,558,580 B2
(45) Date of Patent: Jul. 7, 2009

(54) APPARATUS AND METHOD FOR ANTENNA VERIFICATION OF CLOSED LOOP MODE TRANSMIT DIVERSITY

(75) Inventor: Jeong-Hoon Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 550 days.

(21) Appl. No.: 11/324,690

(22) Filed: Jan. 3, 2006

(65) Prior Publication Data

US 2006/0172776 A1 Aug. 3, 2006

(30) Foreign Application Priority Data

Jan. 28, 2005 (KR) .................. 10-2005-0008048

(51) Int. Cl.
*H04W 72/00* (2009.01)
(52) U.S. Cl. ............... 455/452.1; 455/67.1; 455/101; 455/272; 375/299; 370/252
(58) Field of Classification Search ........... 455/452, 455/67.11, 101, 272; 375/299; 370/252
See application file for complete search history.

(56) References Cited

U.S. PATENT DOCUMENTS

| 6,754,473 | B1 | 6/2004 | Choi et al. | |
|---|---|---|---|---|
| 6,839,326 | B1 * | 1/2005 | Pajukoski et al. | 370/252 |
| 7,054,639 | B2 * | 5/2006 | Lin et al. | 455/452.1 |
| 7,116,723 | B2 * | 10/2006 | Kim et al. | 375/267 |
| 2003/0148770 | A1 | 8/2003 | Das et al. | |
| 2004/0147234 | A1 * | 7/2004 | Lin et al. | 455/101 |
| 2004/0171357 | A1 | 9/2004 | Lobinger et al. | |
| 2005/0047384 | A1 * | 3/2005 | Wax et al. | 370/338 |

FOREIGN PATENT DOCUMENTS

KR 2004-0003537 1/2004

OTHER PUBLICATIONS

3GPP: $3^{rd}$ Generation Partnership Project; Technical Specification Group Radio Access Network; TX Diversity Solutions for Multiple Antenna, Jun. 2001.

* cited by examiner

*Primary Examiner*—Matthew D Anderson
*Assistant Examiner*—Minh D Dao
(74) *Attorney, Agent, or Firm*—The Farrell Law Firm, LLP

(57) ABSTRACT

Disclosed is a method for performing a closed loop mode transmit diversity antenna verification in a mobile communication terminal, the method including estimating an uplink error rate by comparing an antenna complex vector, which is estimated by antenna verification to have been applied to transmit diversity in a base station, with an antenna complex vector reported to the base station; and performing the antenna verification to which the estimated uplink error rate is applied, thereby generating an antenna complex vector estimated to have been applied in the base station.

6 Claims, 2 Drawing Sheets

APPARATUS AND METHOD FOR ANTENNA VERIFICATION OF CLOSED LOOP MODE TRANSMIT DIVERSITY

PRIORITY

This application claims to the benefit under 35 U.S.C. 119(a) of an application entitled "Apparatus And Method For Antenna Verification Of Closed Loop Mode Transmit Diversity" filed in the Korean Intellectual Property Office on Jan. 28, 2005 and assigned Serial No. 2005-8048, the entire contents of which are incorporated herein by reference.

BACKGROUND OF THE INVENTION

1. Field of the Invention

The present invention relates to a mobile communication system, and more particularly to an apparatus and a method for antenna verification in a mobile communication terminal employing closed loop mode transmit diversity.

2. Description of the Related Art

Transmit diversity is a technique for increasing reception performance, in such a manner that a transmitting side transmits a signal using at least two antennas and a receiving side combines the signals received from the antennas. The transmit diversity enables the receiving side to obtain a higher gain by changing an amplitude, a phase or a symbol in the patterns of the antennas.

The transmit diversity is largely classified into an open loop mode transmit diversity and a closed loop mode transmit diversity according to whether or not a signaling of a transmission pattern exists. A wideband code division multiple access (WCDMA) system employs transmit diversity which uses two antennas in a base station, and supports two open loop mode transmit diversity schemes and closed loop mode transmit diversity.

The closed loop mode transmit diversity is classified into two modes. Mode 1 changes the phase pattern, and mode 2 changes the phase and amplitude patterns. According to such closed loop mode transmit diversity, a terminal selects a pattern to enlarge the intensity of a reception signal and then notifies a base station of the selected pattern using a feedback information (FBI) field of an uplink dedicated physical control channel (DPCCH), and the base station applies the transmit diversity according to the pattern reported from the terminal.

As an example, mode 1 of the closed loop mode transmit diversity will be described with reference to the 3GPP TS 25.214 V6.4.0 technical specification published on December 2005. In order to obtain the maximum reception signal, a terminal selects phase patterns 'Pi' for the $i^{th}$ slots by using fading information which has been obtained in a reception end using a primary common pilot channel (CPICH) for reception. The terminal inserts a feedback message (FSM) into the FBI field of the uplink DPCCH as shown in Table 1 below and then transmits the uplink DPCCH. Table 1 shows that the FSM is inserted as '0' or '1' into the FBI field of the uplink DPCCH according to phase patterns 'Pi' selected for the $i^{th}$ slots. The calculation method for the phase patterns 'Pi' has been described in detail in annex 'A.2' of the 3GPP TS 25.214 V6.4.0 technical specification.

The base station then receives the FSM through the uplink DPCCH, and generates the antenna complex vectors '$w_1$' and '$w_2$' on the basis of the received FSM, which will be applied to antennas #1 and #2 of a transmitter in the base station, respectively. The antenna complex vectors '$w_1$' and '$w_2$' are defined as shown in Equations 1 and 2 below.

$$w_1 = \frac{1}{\sqrt{2}} \quad (1)$$

$$w_2 = \frac{\sum_{i=n-1}^{n} \cos(\phi_i)}{2} + j\frac{\sum_{i=n-1}^{n} \sin(\phi_i)}{2} \quad (2)$$

In equation 2, $\phi_i \in \{0, \pi, \pi/2, -\pi/2\}$, and 'i' represents an index number for an $i^{th}$ slot in one frame.

In the base station, a dedicated physical channel (DPCH) signal to be transmitted through antennas #1 and #2 is spread/scrambled, and then is divided into two signals so as to correspond to antennas #1 and #2. In the two divided signals, the signal corresponding to antenna #1 is multiplied by the antenna complex vector '$w_1$', and the signal corresponding to antenna #2 is multiplied by the antenna complex vector '$w_2$'. The two signals multiplied by the antenna complex vectors '$w_1$' and '$w_2$', are added to a $CPICH_1$ and a $CPICH_2$, respectively, and then are transmitted through antennas #1 and #2.

In order to demodulate signals to which the transmit antenna diversity is applied as described above, the terminal multiplies the DPCH by the antenna complex vectors '$w_1$' and '$w_2$' which the base station has used in the DPCH transmission. The antenna complex vectors '$w_1$' and '$w_2$' have values transmitted from the terminal to the base station through the uplink DPCCH as described above.

In the case of using the transmit diversity, if the terminal cannot correctly read a transmission pattern (i.e. the phase/amplitude/symbol of a signal transmitted from the base station), the reception performance of the terminal may be of substandard quality as compared with the case of not using any diversity. For this reason, in the case of employing the closed loop mode transmit diversity, in order to prevent the performance deterioration caused by an error in the patterns, the terminal performs a procedure called 'antenna verification' in which the terminal again verifies the pattern transmitted from the base station and performs demodulation.

A poor radio environment can cause an error in the uplink DPCCH. When an error occurs in the FSM transmitted from the terminal to the base station, the base station will perform a transmit diversity using incorrect vector values, not using the antenna complex vectors '$w_1$' and '$w_2$' desired by the terminal. When a transmit diversity using wrong vector values is applied due to an error in the FSM transmitted from the terminal as described above, the reception performance of the terminal deteriorates.

In order to prevent performance deterioration due to a feedback error as described above, the terminal employs an

TABLE 1

| | | Slot # | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| FSM | 0 | 0 | $\pi/2$ | 0 | $\pi/2$ | 0 | $\pi/2$ | 0 | $\pi/2$ | 0 | $\pi/2$ | 0 | $\pi/2$ | 0 | $\pi/2$ | 0 | |
| | 1 | $\pi$ | $-\pi/2$ | $\pi$ | $-\pi/2$ | $\pi$ | $-\pi/2$ | $\pi$ | $-\pi/2$ | $\pi$ | $-\pi/2$ | $\pi$ | $-\pi/2$ | $\pi$ | $-\pi/2$ | $\pi$ | | algorithm which enables the reception unit of the terminal to estimate the antenna complex vectors applied in the base station. Such a procedure for estimating the antenna complex vectors applied to the transmit diversity in the base station is called 'antenna verification'. The 'antenna verification' has been described in detail in annex 'A.1' of the 3GPP TS 25.214 V6.4.0 technical specification.

There are various algorithms used for the antenna verification. Most of the algorithms basically use the power and the signal-to-noise ratio of a DPCCH pilot signal received in the terminal, and an uplink error rate, in order to estimate antenna complex vectors applied to transmit diversity in the base station. The terminal performs antenna verification using this information, and demodulates a received signal, by using the antenna complex vectors estimated to have been applied to the transmit diversity in the base station as the antenna complex vectors '$w_1$' and '$w_2$'.

In the information used in the antenna verification as described above, the power and the signal-to-noise ratio of a DPCCH pilot signal received in the terminal can be estimated from the primary CPICH. Also, it has been generally understood that the uplink error rate is about 4%, which is a target value in network design.

Since the uplink error rate used in the antenna verification is only a target value, the actual uplink error rate may increase depending on the limitation of transmission power when the terminal enters a cell boundary area or a shadow area. In this case, the actual uplink error rate can exceed the uplink error rate established as a target value in design. When the antenna verification algorithm is continuously performed using the target uplink error rate, the accuracy of the antenna verification algorithm deteriorates, thereby increasing performance deterioration due to the transmit diversity. Such a phenomenon is equally caused in both modes 1 and 2 of the closed loop mode transmit diversity.

SUMMARY OF THE INVENTION

Accordingly, the present invention has been made to solve at least the above-mentioned problems occurring in the prior art, and the present invention proposes an apparatus and a method which enable a terminal employing a closed loop mode transmit diversity scheme to obtain a stable transmit diversity gain even in a poor radio environment.

In accordance with one aspect of the present invention, there is provided a method for performing closed loop mode transmit diversity antenna verification in a mobile communication terminal, the method includes the steps of estimating an uplink error rate by comparing an antenna complex vector, which is estimated by antenna verification to have been applied to the transmit diversity in a base station, with an antenna complex vector reported to the base station; and performing the antenna verification to which the estimated uplink error rate is applied, thereby generating an antenna complex vector estimated to have been applied in the base station.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the embodiments of the present invention, a detailed description of known functions and configurations incorporated herein will be omitted when it may obscure the subject matter of the present invention.

Figure 1:
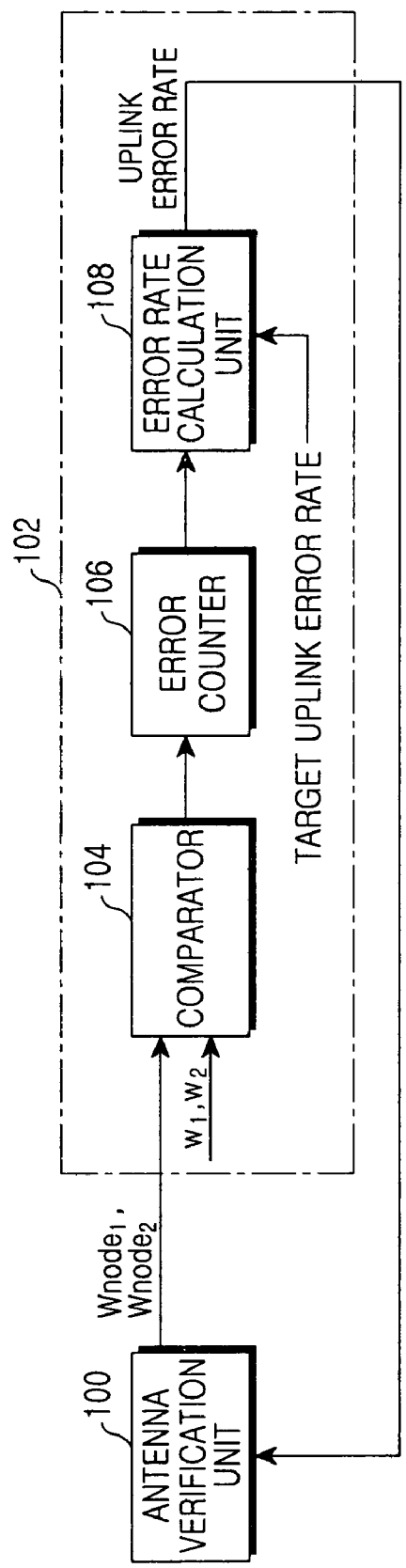
FIG. 1 is a block diagram illustrating a construction of a closed loop mode transmit diversity antenna verification apparatus according to an embodiment of the present invention.

FIG. 1 is a block diagram illustrating a construction of a closed loop mode transmit diversity antenna verification apparatus according to an embodiment of the present invention. The antenna verification apparatus includes an antenna verification unit 100 connected to an uplink error rate estimation unit 102.

The antenna verification unit 100 estimates the antenna complex vectors applied to the transmit diversity in a base station on the basis of the power and the signal-to-noise ratio of a DPCCH pilot signal received in a terminal, and an uplink error rate. The antenna verification unit 100 performs the antenna verification, not using a target uplink error rate used in the prior art, but using an uplink error rate provided from the uplink error rate estimation unit 102 according to an embodiment of the present invention.

The uplink error rate estimation unit 102 compares the antenna complex vectors $Wnode_1$ and $Wnode_2$ (estimated by the antenna verification unit 100) with antenna complex vectors $w_1$ and $w_2$ (corresponding to an FSM reported from the terminal to the base station), thereby estimating an uplink error rate. The uplink error rate estimation unit 102 then provides the antenna verification unit 100 with the estimated uplink error rate so that the estimated uplink error rate may be applied to the antenna verification. The uplink error rate estimation unit 102 includes a comparator 104, an error counter 106 and an error rate calculation unit 108.

The comparator 104 compares reported antenna complex vectors $w_1$ and $w_2$ with estimated antenna complex vectors $Wnode_1$ and $Wnode_2$ during every reception slot. As a result of the comparison in the comparator 104, when the compared values differ from each other, the error counter 106 performs the error count, thereby increasing an error count value by one.

The estimated antenna complex vectors $Wnode_1$ and $Wnode_2$ and the reported antenna complex vectors $w_1$ and $w_2$ are compared by the comparator 104 during every reception slot, and the error count value is increased by "1" during every reception slot on which the compared values differs from each other. The error count value counted by the error counter 106 as described above is provided to the error rate calculation unit 108. The error rate calculation unit 108 calculates an estimated uplink error rate on the basis of the error count value, and provides the antenna verification unit 100 with the estimated uplink error rate so that the estimated uplink error rate may be used as an uplink error rate to be applied to the antenna verification.

Figure 2:
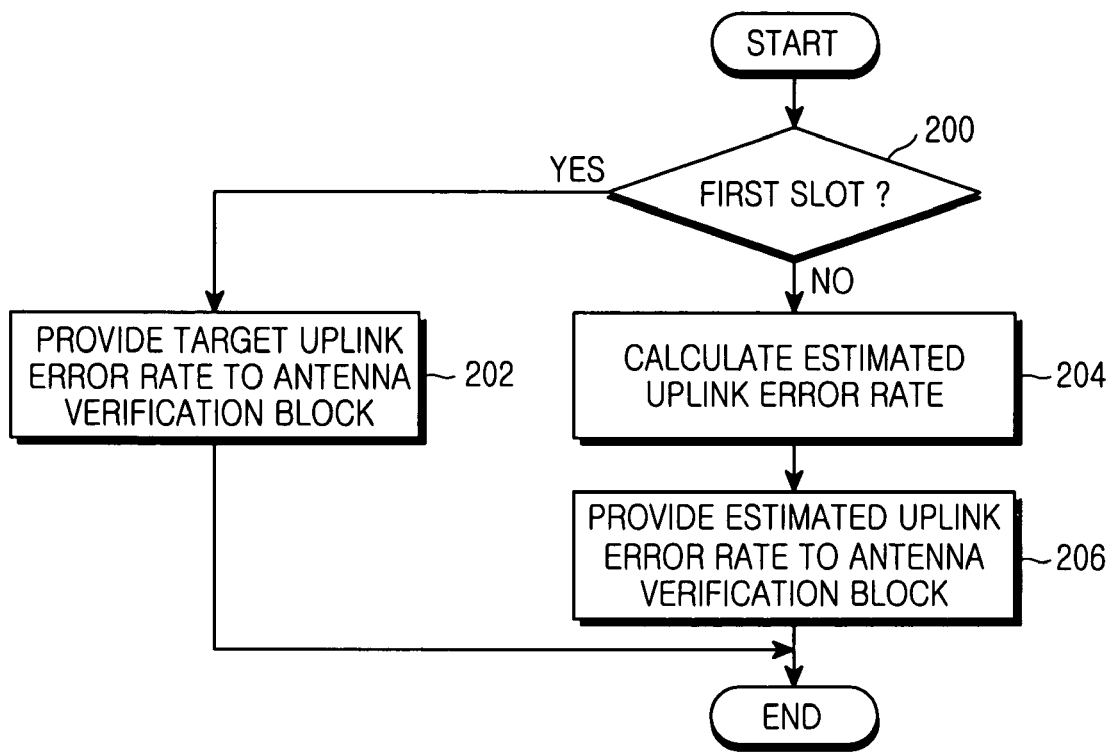
FIG. 2 is a flowchart illustrating a processing procedure of an error rate calculation unit according to an embodiment of the present invention.

A processing procedure of the error rate calculation unit 108 is shown in FIG. 2. The processing procedure shown in FIG. 2 is executed by the error rate calculation unit 108 during every reception slot. First in step 200, a determination is made as to whether a current reception slot is the first reception slot. As a result, when it is determined that a current reception slot is the first reception slot, step 202 is performed. In contrast, when it is determined that a current reception slot is the second or following reception slot, steps 204 and 206 are performed.

With respect to the first slot, the error rate calculation unit 108 determines a target uplink error rate, which has been established in network design, to be the uplink error rate applied to antenna verification as described above, and provides the target uplink error rate to the antenna verification unit 100 in step 202.

In contrast to this, with respect to the second or following slot, the error rate calculation unit 108 calculates an estimated uplink error rate by reflecting an error count value in the target uplink error rate in step 204. Then, the error rate calculation unit 108 provides the antenna verification unit 100 with the calculated estimated uplink error rate in step 206 so that the calculated estimated uplink error rate may be used as an uplink error rate to be applied to antenna verification.

The antenna verification unit 100 can perform the antenna verification using an estimated uplink error rate in which the change of the actual radio environment is adaptively reflected, instead of using a fixed target uplink error rate in which the change of the actual radio environment is not reflected.

As described above, since the antenna verification is performed using an estimated uplink error rate in which the change of the actual radio environment is adaptively reflected, the terminal can obtain a stable transmit diversity gain even though the terminal is in a poor radio environment.

While the present invention has been shown and described with reference to a certain preferred embodiment thereof, it will be understood by those skilled in the art that various changes in form and details may be made within the spirit and scope of the invention. Particularly, while the present invention has been described with respect to closed loop mode transmit diversity of an WCDMA system, the present invention can also be applied to performing the antenna verification by using an uplink error rate in another mobile communication system employing a closed loop mode transmit diversity.

In addition, according to an embodiment of the present invention, the error rate calculation unit 108 calculates an estimated uplink error rate by reflecting an error count value in the target uplink error rate. This is because when it is intended that an uplink error rate is calculated using only error count values, it is necessary to perform a comparison with respect to a sufficient number of slots so as to obtain an error rate approximating to the actual error rate.

Since the actual uplink error rate will change on the basis of the target uplink error rate, an estimated uplink error rate can be obtained as a value approximating to its actual uplink error rate, by using the target uplink error rate as an initial estimated uplink error rate.

In addition, if necessary, an uplink error rate may be calculated with only an error count value which is obtained from a comparison result with respect to a sufficient number of slots, and not the target uplink error rate but another value may be used as an initial value.

Accordingly, the scope of the invention is not to be limited by the above embodiments but by the claims and the equivalents thereof.

What is claimed is:

1. An apparatus for performing an antenna verification of a closed loop mode transmit diversity in a mobile communication terminal, the apparatus comprising:

an antenna verification unit for performing the antenna verification to which an uplink error rate is applied and generating an antenna complex vector which is estimated by the antenna verification to have been applied to transmit diversity in a base station; and an uplink error rate estimation unit for estimating an uplink error rate by comparing the estimated antenna complex vector with an antenna complex vector reported to a base station, and providing the antenna verification unit with the estimated uplink error rate, the estimated uplink error rate used as the uplink error rate to be applied to the antenna verification.

2. The apparatus as claimed in claim 1, wherein the uplink error rate estimation unit comprises:

a comparator for comparing the reported antenna complex vector and the estimated antenna complex vector during every reception slot;

an error counter for increasing an error count value when the reported antenna complex vector is different from the estimated antenna complex vector; and an error rate calculation unit for calculating the estimated uplink error rate on the basis of the error count value.

3. The apparatus as claimed in claim 2, wherein the error rate calculation unit determines a predetermined target uplink error rate to be the uplink error rate applied to the antenna verification with respect to a first slot, and calculates the estimated uplink error rate by reflecting the error count value in the target uplink error rate with respect to a second and following slots.

4. A method for performing a closed loop mode transmit diversity antenna verification in a mobile communication terminal, the method comprising the steps of:

estimating an uplink error rate by comparing an antenna complex vector, which is estimated by antenna verification to have been applied to transmit diversity in a base station, with an antenna complex vector reported to the base station; and performing the antenna verification to which the estimated uplink error rate is applied, thereby generating an antenna complex vector estimated to have been applied in the base station.

5. The method as claimed in claim 4, wherein the estimating step comprises the steps of:

comparing the reported antenna complex vector and the estimated antenna complex vector during every reception slot;

increasing an error count value when the reported antenna complex vector is different from the estimated antenna complex vector; and calculating the estimated uplink error rate on the basis of the error count value.

6. The method as claimed in claim 5, wherein the calculating step comprises the steps:

determining a target uplink error rate to be the uplink error rate applied to the antenna verification with respect to a first slot; and calculating the estimated uplink error rate by reflecting the error count value in the target uplink error rate with respect to a second and following slots.

* * * * *